US011077521B2

(12) United States Patent
Montaron et al.

(10) Patent No.: US 11,077,521 B2
(45) Date of Patent: Aug. 3, 2021

(54) CREATING RADIAL SLOTS IN A SUBTERRANEAN FORMATION

(71) Applicant: SCHLUMBERGER TECHNOLOGY CORPORATION, Sugar Land, TX (US)

(72) Inventors: Bernard Montaron, Kuala Lumpur (MY); Douglas Pipchuk, Calgary (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 733 days.

(21) Appl. No.: 15/522,968

(22) PCT Filed: Oct. 30, 2015

(86) PCT No.: PCT/US2015/058199
§ 371 (c)(1),
(2) Date: Apr. 28, 2017

(87) PCT Pub. No.: WO2016/069977
PCT Pub. Date: May 6, 2016

(65) Prior Publication Data
US 2018/0272467 A1 Sep. 27, 2018

Related U.S. Application Data

(60) Provisional application No. 62/072,894, filed on Oct. 30, 2014.

(51) Int. Cl.
*B23K 26/38* (2014.01)
*E21B 47/00* (2012.01)
(Continued)

(52) U.S. Cl.
CPC ............ *B23K 26/106* (2013.01); *B23K 26/38* (2013.01); *E21B 36/00* (2013.01); *E21B 43/11* (2013.01);
(Continued)

(58) Field of Classification Search
CPC .......... B23K 26/10; B23K 26/38; E21B 43/11
(Continued)

(56) References Cited

U.S. PATENT DOCUMENTS 3,461,964 A  8/1969  Venghiattis
3,749,878 A  7/1973  Sullivan et al.
(Continued)

FOREIGN PATENT DOCUMENTS

CA    2596201 A1   6/2008
EP    0644316 A2   3/1995
(Continued)

OTHER PUBLICATIONS

International Search Report and Written Opinion issued in International Appl. No. PCT/US2015/058199 dated Jan. 7, 2016; 19 pages.
(Continued)

*Primary Examiner* — Robert J Utama
*Assistant Examiner* — Lawrence H Samuels
(74) *Attorney, Agent, or Firm* — Michael L. Flynn

(57) ABSTRACT

A laser cutting apparatus conveyable within a casing lining at least a portion of a wellbore that extends into a subterranean formation. The laser cutting apparatus includes a housing, a deflector, a motor, a sensor, and a processing device. The deflector rotates relative to the housing to direct a laser beam to form a radial slot extending through the casing and into the subterranean formation. The motor rotates the deflector. The sensor generates information related to depth of the radial slot in real-time as the radial slot is formed by the laser beam. The processing device
(Continued)

receives the information generated by the sensor and causes the motor to rotate the deflector based on the received information.

19 Claims, 7 Drawing Sheets

(51) Int. Cl.
  *E21B 43/11*   (2006.01)
  *B23K 26/10*   (2006.01)
  *E21B 36/00*   (2006.01)
  *B23K 101/10*  (2006.01)

(52) U.S. Cl.
  CPC ......... *B23K 2101/10* (2018.08); *E21B 36/003* (2013.01)

(58) Field of Classification Search
  USPC .......................................... 219/121.6–121.86
  See application file for complete search history.

(56) References Cited

U.S. PATENT DOCUMENTS

| | | | |
|---|---|---|---|
| 4,199,034 A | 4/1980 | Salisbury et al. | |
| 4,766,577 A * | 8/1988 | Clerke | E21B 47/002 367/35 |
| 4,850,431 A | 7/1989 | Austin et al. | |
| 4,974,675 A | 12/1990 | Austin et al. | |
| 4,977,961 A | 12/1990 | Avasthi | |
| 5,249,628 A | 10/1993 | Suijaatmadia | |
| 5,325,923 A | 7/1994 | Suijaatmadja et al. | |
| 5,335,724 A | 8/1994 | Venditto et al. | |
| 5,361,856 A | 11/1994 | Suijaatmadja et al. | |
| 5,381,631 A | 1/1995 | Raghavan et al. | |
| 5,396,957 A | 3/1995 | Surjaatmadja et al. | |
| 5,445,220 A | 8/1995 | Gurevich et al. | |
| 5,482,116 A | 1/1996 | El-Rabaa et al. | |
| 5,494,103 A | 2/1996 | Surjaatmadja et al. | |
| 5,820,795 A | 10/1998 | Takemori et al. | |
| 6,021,377 A * | 2/2000 | Dubinsky | E21B 7/068 702/9 |
| 6,155,343 A * | 12/2000 | Nazzal | E21B 29/00 166/222 |
| 6,286,599 B1 | 9/2001 | Surjaatmadja et al. | |
| 6,351,991 B1 | 3/2002 | Sinha | |
| 6,394,184 B2 | 5/2002 | Tolman et al. | |
| 6,543,538 B2 | 4/2003 | Tolman et al. | |
| 6,564,868 B1 | 5/2003 | Ferguson et al. | |
| 6,904,365 B2 | 6/2005 | Bratton et al. | |
| 6,975,465 B1 | 12/2005 | Chung et al. | |
| 7,032,671 B2 | 4/2006 | Aud | |
| 7,096,954 B2 | 8/2006 | Weng et al. | |
| 7,357,182 B2 | 4/2008 | Hunt et al. | |
| 7,413,010 B2 | 8/2008 | Blauch et al. | |
| 7,434,633 B2 | 10/2008 | Lynde et al. | |
| 7,490,664 B2 * | 2/2009 | Skinner | E21B 7/15 166/57 |
| 7,527,092 B2 | 5/2009 | McAfee | |
| 7,546,876 B2 | 6/2009 | McAfee | |
| 7,571,766 B2 | 8/2009 | Pauls et al. | |
| 7,640,982 B2 | 1/2010 | Schultz et al. | |
| 7,644,761 B1 | 1/2010 | Gu et al. | |
| 7,788,037 B2 | 8/2010 | Soliman et al. | |
| 7,828,063 B2 | 11/2010 | Olsen et al. | |
| 7,848,895 B2 | 12/2010 | Zoback et al. | |
| 7,882,745 B2 | 2/2011 | Huang et al. | |
| 8,126,646 B2 | 2/2012 | Grove et al. | |
| 8,126,689 B2 | 2/2012 | Soliman et al. | |
| 8,439,116 B2 | 5/2013 | East, Jr. et al. | |
| 8,464,794 B2 * | 6/2013 | Schultz | E21B 43/12 166/297 |
| 8,770,316 B2 | 7/2014 | Jelsma | |
| 8,887,803 B2 | 11/2014 | East, Jr. et al. | |
| 9,297,250 B2 | 3/2016 | Dusterhoft et al. | |
| 2003/0019848 A1* | 1/2003 | Nicholas | B23K 26/0342 219/121.7 |
| 2004/0206505 A1 | 10/2004 | Batarseh | |
| 2004/0206733 A1 | 10/2004 | Hillebrand et al. | |
| 2005/0173388 A1 | 8/2005 | Lavers et al. | |
| 2006/0102343 A1* | 5/2006 | Skinner | G01N 21/718 166/250.1 |
| 2006/0231257 A1* | 10/2006 | Reed | B28D 1/00 166/297 |
| 2008/0166132 A1* | 7/2008 | Lynde | E21B 29/06 398/142 |
| 2009/0045176 A1 | 2/2009 | Wawers et al. | |
| 2009/0065252 A1 | 3/2009 | Moos et al. | |
| 2009/0109794 A1 | 4/2009 | Sinha | |
| 2009/0125240 A1 | 5/2009 | den Boer et al. | |
| 2009/0133871 A1 | 5/2009 | Skinner et al. | |
| 2009/0288833 A1 | 11/2009 | Graham et al. | |
| 2009/0288834 A1 | 11/2009 | Erkol et al. | |
| 2009/0288884 A1 | 11/2009 | Jelsma | |
| 2010/0250214 A1 | 9/2010 | Prioul et al. | |
| 2010/0326659 A1* | 12/2010 | Schultz | E21B 43/12 166/297 |
| 2011/0017458 A1* | 1/2011 | East, Jr. | E21B 43/26 166/308.1 |
| 2011/0168443 A1* | 7/2011 | Smolka | E21B 7/14 175/15 |
| 2011/0192595 A1* | 8/2011 | Ronaes | E21B 33/00 166/250.01 |
| 2011/0198087 A1 | 8/2011 | Adam | |
| 2011/0209868 A1 | 9/2011 | Dusterhoft et al. | |
| 2011/0247815 A1 | 10/2011 | Jelsma | |
| 2012/0000893 A1* | 1/2012 | Broude | B23K 26/032 219/121.69 |
| 2012/0074110 A1* | 3/2012 | Zediker | B23K 26/1224 219/121.72 |
| 2012/0176862 A1 | 7/2012 | Dangelo et al. | |
| 2012/0217019 A1* | 8/2012 | Zediker | E21B 33/063 166/363 |
| 2012/0265192 A1* | 10/2012 | Sliwa | A61B 8/0858 606/33 |
| 2013/0008659 A1 | 1/2013 | Schultz et al. | |
| 2013/0032349 A1 | 2/2013 | Alekseenko et al. | |
| 2013/0220604 A1 | 8/2013 | El-Rabaa et al. | |
| 2013/0228372 A1 | 9/2013 | Linyaev et al. | |
| 2013/0228557 A1 | 9/2013 | Zediker et al. | |
| 2013/0265409 A1* | 10/2013 | Tjhang | H04N 5/23206 348/82 |
| 2014/0069653 A1* | 3/2014 | Liu | E21B 43/26 166/308.1 |
| 2014/0146314 A1* | 5/2014 | Ronaes | G01N 15/1459 356/336 |
| 2014/0182933 A1* | 7/2014 | Skinner | B23K 26/40 175/16 |
| 2014/0222405 A1 | 8/2014 | Lecerf et al. | |
| 2014/0278316 A1 | 9/2014 | Dusterhoft et al. | |
| 2015/0129211 A1 | 5/2015 | Dusseault et al. | |
| 2015/0167447 A1* | 6/2015 | Tjhang | E21B 47/18 348/85 |
| 2015/0176400 A1 | 6/2015 | Kulathu et al. | |
| 2016/0108705 A1 | 4/2016 | Maxwell et al. | |
| 2016/0312587 A1 | 10/2016 | Montaron et al. | |
| 2017/0214213 A1 | 7/2017 | Zediker et al. | |

FOREIGN PATENT DOCUMENTS

| | | |
|---|---|---|
| WO | 2001061146 A1 | 8/2001 |
| WO | 2002006629 A1 | 1/2002 |
| WO | 2004009956 A1 | 1/2004 |
| WO | 2009096805 A1 | 8/2009 |
| WO | 2011148315 A2 | 12/2011 |
| WO | 2012031009 A1 | 3/2012 |

(56) References Cited

FOREIGN PATENT DOCUMENTS

| WO | 2014036742 A1 | 3/2014 |
|---|---|---|
| WO | 2014078663 A2 | 5/2014 |

OTHER PUBLICATIONS

Extended European Search Report issued in European Patent Appl. No. 15854773.7 dated Jul. 5, 2018; 5 pages.
Jet Edge, "Waterjet Success Stories Case Studies," [online], [retrieved on Jan. 4, 2012], Retrieved from the Internet<URL: http://jetedge.com/content.cfm?fuseaction=dsp_success_case&case_ID=92>.
Halao, C., "A Study of Horizontal Wellbore Failure," SPE16927, SPE Production Engineering, Nov. 1988, pp. 489-494.
Yew et al., "Fracturing of a Deviated Well," SPE 16930, SPE Production Engineering, Nov. 1988, pp. 429-437.
Rabaa, W. El, "Experimental Study of Hydraulic Fracture Geometry Initiated From Horizontal Wells," SPE 19720, presented at the 64th Annual Technical Conference and Exhibition of the Society of Petroleum Engineers, San Antonio, Texas, Oct. 8-11, 1989, pp. 189-204.
Hossain et al., "A Comprehensive Monograph for Hydraulic Fracture Initiation From Deviated Wellbores Under Arbitrary Stress Regimes," SPE 54360, presented at the 1999 SPE Asia Pacific Oil and Gas Conference and Exhibition, Jakarta, Indonesia, Apr. 20-22, 1999, pp. 1-11.
Waters, et al., "Use of Horizontal Well Image Tools to Optimize Barnett Shale Reservoir Exploitation," SPE 103202, presented at the 2006 SPE Annual Technical Conference and Exhibition, San Antonio, Texas, Sep. 24-27, 2006, pp. 1-13.
Thiercelin et al., "Formation Characterization: Rock Mechanics", Economides M.J. and Nolte K.G., Reservoir Stimulation, John Wiley and Sons, Ltd, 3rd Edition New York, 2000, Chapter 3, pp. 3-1 to 3-35.
Smith et al., "Basics of Hydraulic Fracturing", Economides M.J. and Nolte K.G., Reservoir Stimulation, John Wiley and Sons, Ltd, 3rd Edition New York, 2000—Chapter 5, pp. 5-1 to 5-28.
Gulbis et al., "Fracturing Fluid Chemistry and Proppants", Economides M.J. and Nolte K.G., Reservoir Stimulation, John Wiley and Sons, Ltd, 3rd Edition New York, 2000—Chapter 7, pp. 7-1 to 7-23.
Aadnoy, "Stresses Around Horizontal Boreholes Drilled in Sedimentary Rocks," Journal of Petroleum Science and Engineering, 2 (1989), pp. 349-360.
Almaguer et al., "Orienting Perforation in the Right Direction", Oilfield Review, Spring 2002, pp. 16-31.

\* cited by examiner

CREATING RADIAL SLOTS IN A SUBTERRANEAN FORMATION

CROSS-REFERENCE TO RELATED APPLICATIONS

This application is a national stage application of PCT Application No. PCT/US2015/058199, entitled CREATING RADIAL SLOTS IN A SUBTERRANEAN FORMATION, filed Oct. 30, 2015, which claims priority to and the benefit of U.S. Provisional Application No. 62/072,894, entitled "LASER CUTTING SEQUENCE AND CONTROL SYSTEM FOR CUTTING SLOTS IN WELLBORES", filed Oct. 30, 2014, the entire disclosures of each being hereby incorporated herein by reference.

BACKGROUND OF THE DISCLOSURE

Oilfield operations may be performed to locate and gather downhole fluids, such as those containing hydrocarbons. Wellbores may be drilled along a selected trajectory to reach one or more subterranean rock formations containing the hydrocarbons and other downhole fluids. The trajectory may be defined to facilitate passage through the subterranean rock formations and to facilitate production. The selected trajectory may have vertical, angled, and/or horizontal portions, based on stresses, boundaries, and/or other characteristics of the formation.

Fracturing operations may include creating and/or expanding fractures in the formation to create and/or increase flow pathways within the formation, such as by injecting fracturing fluid into the formation via a wellbore penetrating the formation. Fracturing may be affected by various factors related to the wellbore, such as the presence of casing and cement in the wellbore, open-hole completions, and the intended spacing for fracturing and/or injection, among other examples.

Prior to fracturing operations, the formation may be perforated along a plane that is transverse (i.e., perpendicular) to a wellbore axis. Fracturing fluid is then pumped into the perforations to propagate fractures along the same plane. However, at distances further away from the wellbore, the direction of the fractures may change if the perforations were not cut deep enough. Changes in the direction of the fractures may result in complex fluid pathways extending to the wellbore, resulting in a bottleneck that may reduce overall hydraulic conductivity of the fractures and, thus, adversely impact hydrocarbon productivity.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a laser cutting apparatus conveyable within a casing lining at least a portion of a wellbore that extends into a subterranean formation. The laser cutting apparatus includes a housing, a deflector, a motor, a sensor, and a processing device. The deflector is operable for rotation relative to the housing to direct a laser beam to form a radial slot extending through the casing and into the subterranean formation. The motor is operable to rotate the deflector. The sensor is operable to generate information related to depth of the radial slot in real-time as the radial slot is formed by the laser beam. The processing device is operable to receive the information generated by the sensor and cause the motor to rotate the deflector based on the received information.

The present disclosure also introduces a method that includes conveying a laser cutting apparatus within a casing lining at least a portion of a wellbore that extends into a subterranean formation, and transmitting a laser beam to a deflector of the laser cutting apparatus. The method also includes operating a motor of the laser cutting apparatus to control rotation of the deflector, thus directing the laser beam deflected by the deflector to form a radial slot extending through the casing to a predetermined depth within the subterranean formation, including operating the motor to sequentially rotate the deflector to each one of a plurality of angular positions and maintain the deflector at each successive one of the plurality of angular positions until the laser beam penetrates the subterranean formation to a predetermined depth at that angular position, such that the radial slot extends through a predetermined angle encompassing the plurality of angular positions.

The present disclosure also introduces a method that includes conveying a laser cutting apparatus within a casing lining at least a portion of a wellbore that extends into a subterranean formation, and transmitting a laser beam to a deflector of the laser cutting apparatus. The method also includes operating a motor of the laser cutting apparatus to repeatedly rotate the deflector through a plurality of cycles, where each of the plurality of cycles comprises a first substantially continuous rotation of the deflector through a predetermined angle in a first rotational direction and a second substantially continuous rotation of the deflector through the predetermined angle in a second rotational direction, thus directing the laser beam deflected by the deflector to form a radial slot extending radially through the casing and, with each successive one of the plurality of cycles, extend the radial slot to a predetermined depth within the subterranean formation, such that opposing first and second sides of the radial slot are angularly disposed at the predetermined angle.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
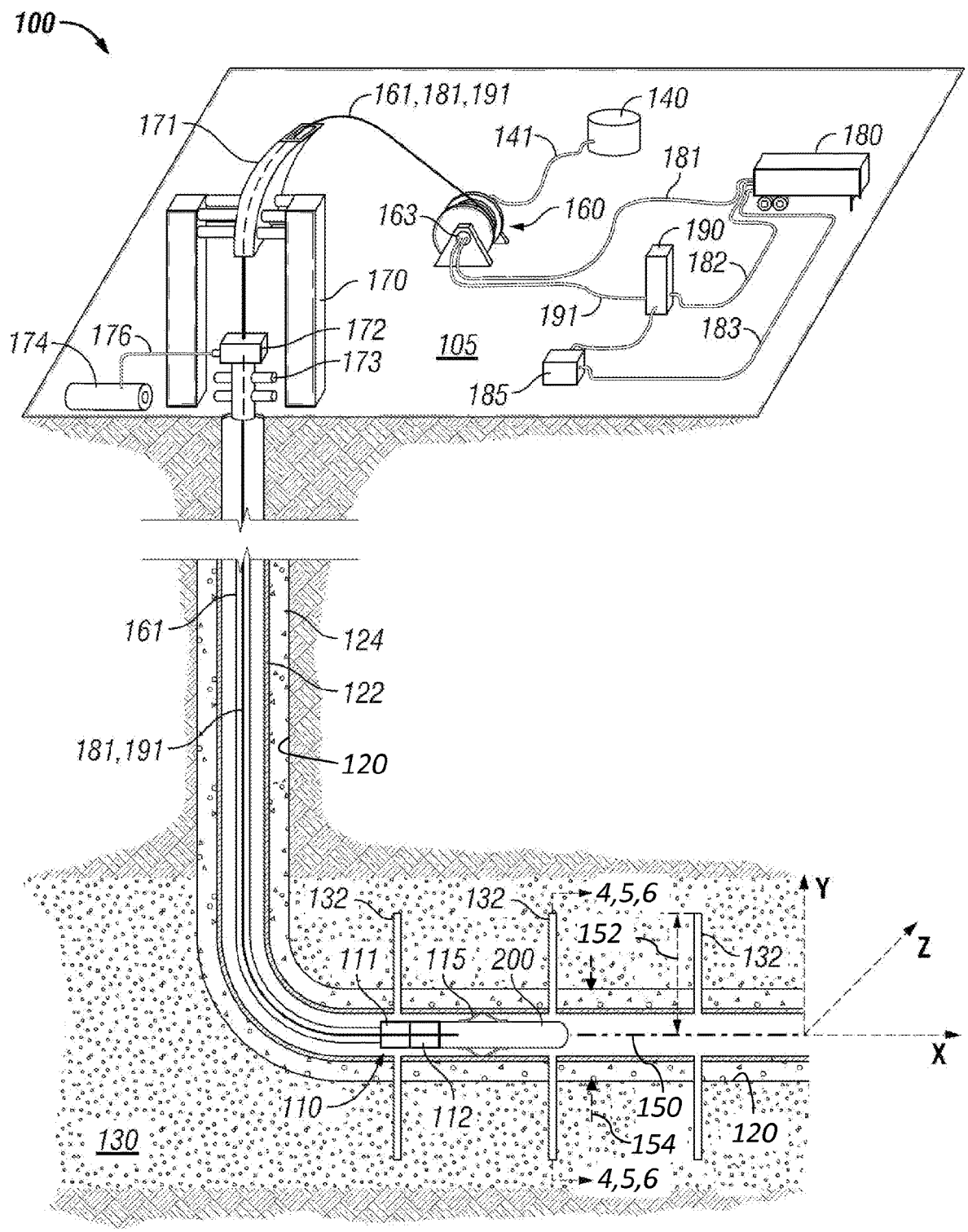
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a wellsite system 100 according to one or more aspects of the present disclosure. The wellsite system 100 is operable at a wellsite 105 adjacent a wellbore 120 extending from the wellsite 105 into one or more subterranean formations 130. In the context of the present disclosure, the term "subterranean formation" (or simply "formation") may be given its broadest possible meaning and may include, without limitation, various rocks and other natural materials, as well as cement and other artificial materials, including rock layer formations, such as, granite, basalt, sandstone, dolomite, sand, salt, limestone, rhyolite, quartzite, and shale, among others. The wellbore 120 comprises a central axis 150 and a wellbore diameter 154. When utilized in cased-hole implementations, a cement sheath 124 may secure a casing 122 within the wellbore 120.

The example wellsite system 100 is operable to form radial slots and/or perforations (hereafter collectively referred to as radial slots) 132 in the wellbore casing 122, the cement sheath 124, and the formation 130. At the wellsite 105, the wellsite system 100 may comprise a control and power center 180, which may provide control signals and electrical power via electrical conductors 181, 182, 183 extending between the control and power center 180 and a laser source 190, a laser generator chiller 185, and a tool string 110 positioned within the wellbore 120. The laser source 190 may provide energy in the form of a laser beam to a laser cutting apparatus 200 that forms at least a portion of the tool string 110. An optical conductor 191, such as may comprise one or more fiber optic cables, may convey the laser beam from the laser source 190 to the laser cutting apparatus 200.

The wellsite system 100 may further comprise a fluid source 140 from which a fluid (hereinafter referred to as a "surface fluid") may be conveyed by a fluid conduit 141 to a spool 160 of coiled tubing 161 and/or other conduits that may be deployed into the wellbore 120. The spool 160 may be rotated to advance and retract the coiled tubing 161 within the wellbore 120. The optical conductor 191, the electrical conductor 181, and the fluid conduit 141 may be attached to the coiled tubing 161 by, for example, a swivel or other rotating coupling 163. The coiled tubing 161 may be operable to convey the surface fluid received from the fluid source 140 along the length of the wellbore 120 to the tool string 110 coupled at the downhole end of the coiled tubing 161. The coiled tubing 161 may be further operable to transmit or convey therein the optical conductor 191 and/or the electrical conductor 181 from the wellsite 105 to the tool string 110. The electrical and optical conductors 181, 191 may be disposed within the coiled tubing 161 inside a protective metal carrier (not shown) to insulate and protect the conductors 181, 191 from the surface fluid inside the coiled tubing 161. However, the optical conductor 191 and/or the electrical conductor 181 may also or instead be conveyed into the wellbore 120 on the outside of the coiled tubing 161.

The wellsite system 100 may further comprise a support structure 170, such as may include a coiled tubing injector 171 and/or other apparatus operable to facilitate movement of the coiled tubing 161 in the wellbore 120. Other support structures may be also or instead included, such as a derrick, a crane, a mast, a tripod, and/or other structures. A diverter 172, a blow-out preventer (BOP) 173, and/or a fluid handling system 174 may also be included as part of the wellsite system 100. For example, during deployment, the coiled tubing 161 may be passed from the injector 171, through the diverter 172 and the BOP 173, and into the wellbore 120.

The tool string 110 may be conveyed along the wellbore 120 via the coiled tubing 161 in conjunction with the coiled tubing injector 171, such as may be operable to apply an adjustable uphole and downhole force to the coiled tubing 161 to advance and retract the tool string 110 within the wellbore 120. Although FIG. 1 depicts a coiled tubing injector 171, it is to be understood that other means operable to advance and retract the tool string 110, such as a crane, a winch, a draw-works, a top drive, and/or other lifting device coupled to the tool string 110 via the coiled tubing 161 and/or other conveyance means (e.g., wireline, drill pipe, production tubing, etc.), may also or instead be included as part of the wellsite system 100.

During cutting operations, the surface fluid may be conveyed through the coiled tubing 161 and be directed into the radial slots 132 adjacent to the tool string 110. Thereafter, the surface fluid and other wellbore fluid may exit the radial slots 132 into an annular area between the sidewall of the casing 122 and the tool string 110 and flow in the uphole direction out of the wellbore 120. The diverter 172 may direct the returning fluid to the fluid handling system 174 through one or more conduits 176. The fluid handling system 174 may be operable to clean the returning fluid and/or prevent the returning fluid from escaping into the environment. The cleaned surface fluid may then be returned to the fluid source 140 or otherwise contained for later use, treatment, and/or disposal.

The tool string 110 may comprise a first portion 111, a second portion 112 coupled with the first portion 111, and the laser cutting apparatus 200 coupled with the second portion 112. The tool string 110 is further shown in connection with the optical conductor 191 and the electrical conductor 181, which may extend through at least a portion of the first and second portions 111, 112 of the tool string 110 and the laser cutting apparatus 200. As stated above, the optical conductor 191 may be operable to transmit the laser beam from the laser source 190 to the laser cutting apparatus 200, whereas the electrical conductor 181 may be operable to transmit electrical control signals and/or electrical power between the control and power center 180 and the first and second portions 111, 112 of the tool string 110 and/or the laser cutting apparatus 200.

The electrical conductor 181 may also permit electrical communication between the first and second portions 111, 112 of the tool string 110 and the laser cutting apparatus 200, and may comprise various electrical connectors and/or interfaces (not shown) for electrical connection with the first and second portions 111, 112 of the tool string 110 and the laser cutting apparatus 200. Although the electrical conductor 181 is depicted in FIG. 1 as a single continuous electrical conductor, the wellsite system 100 may comprise a plurality of electrical conductors (not shown) extending along the coiled tubing 161, wherein one or more of the conductors may be separately connected with the first portion 111, the second portion 112, and/or the laser cutting apparatus 200. Also, although FIG. 1 depicts the laser cutting apparatus 200 being coupled at the downhole end of the tool string 110, the laser cutting apparatus 200 may be coupled between the first and second portions 111, 112 of the tool string 110, or further uphole in the tool string 110 with respect to the first and the second portions 111, 112. The tool string 110 may also comprise more than one instance of the laser cutting apparatus 200, as well as other apparatus not explicitly described herein.

The first and second portions 111, 112 of the tool string 110 may each be or comprise at least a portion of one or more downhole tools, modules, and/or other apparatus operable in wireline, while-drilling, coiled tubing, completion, production, and/or other operations. For example, the first and second portions 111, 112 may each be or comprise at least a portion of an acoustic tool, a density tool, a directional drilling tool, a drilling tool, an electromagnetic (EM) tool, a formation evaluation tool, a gravity tool, a formation logging tool, a magnetic resonance tool, a formation measurement tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tough logging condition tool. However, other downhole tools are also within the scope of the present disclosure. Although FIG. 1 depicts the tool string 110 comprising two portions 111, 112 directly and/or indirectly coupled with the laser cutting apparatus 200, it is to be understood that the tool string 110 may comprise a different number of portions each directly and/or indirectly coupled with the laser cutting apparatus 200.

The first portion 111 may be or comprise a logging tool, such as a casing collar locator (CCL) operable to detect ends of collars of the casing 122 by sensing a magnetic irregularity caused by the relatively high mass of the collar ends. The CCL may transmit a signal in real-time to wellsite equipment, such as the control and power center 180, via the electrical conductor 181. The CCL signal may be utilized to determine the position of the laser cutting apparatus 200 with respect to known casing collar numbers and/or positions within the wellbore 120. Therefore, the CCL may be utilized to detect and/or log the location of the laser cutting apparatus 200 within the wellbore 120. Although the first portion 111 comprising the CCL is depicted as separate tool indirectly coupled with the laser cutting apparatus 200, it is to be understood that the CCL or other locator tool may be integrated into the laser cutting apparatus 200.

The second portion 112 of the tool string 110 may be or comprise an inclination sensor and/or other orientation sensors, such as one or more accelerometers, magnetometers, gyroscopic sensors (e.g., micro-electro-mechanical system (MEMS) gyros), and/or other sensors for utilization in determining the orientation of the tool string 110 relative to the wellbore 120. Although the second portion 112 comprising the orientation sensor(s) is depicted as a separate tool coupled with the laser cutting apparatus 200, it is to be understood that the orientation sensor(s) may be integrated into the laser cutting apparatus 200.

An anchoring device 115 may also be included as part of the tool string 110, such as may be operable to positionally fix or set the laser cutting apparatus 200 relative to the wellbore 120 (e.g., against the casing 122) at an intended location for cutting the radial slots 132 in the casing 122 and/or the formation 130. For example, the anchoring device 115 may positively fix or set the laser cutting apparatus 200 along the central axis 150 of the wellbore 120, such that a central axis 215 (e.g., see FIG. 2) of the laser cutting apparatus 200 may substantially coincide with the central axis 150 of the wellbore 120. Centralizing of the laser cutting apparatus 200 along the wellbore 120 may further centralize an axis of rotation 251 of a deflector 250 of the laser cutting apparatus 200 (e.g., see FIG. 2), such that the central axis 150 of the wellbore 120 and the axis of rotation 251 substantially coincide. The anchoring device 115 may be controlled mechanically, hydraulically, electrically, and/or otherwise, including in implementations permitting retraction of the anchoring device 115 before moving the coiled tubing 161 to another location. The anchoring device 115 may be selected from various fixation or setting devices, such as an anchor or a packer, which may be operable to centralize, anchor, and/or fix the tool string 110 and/or the laser cutting apparatus 200 at a predetermined stand-off distance and/or position along the wellbore 120. The anchoring device 115 may also or instead comprise embedding or friction elements, such as bumpers or slips, which may engage the inner surface of the casing 122. Although FIG. 1 depicts the anchoring device 115 as part of the laser cutting apparatus 200, it is to be understood that the anchoring device 115 may be included in the tool string 110 as a separate tool or portion, such as part of the first and/or second portions 111, 112 of the tool string 110.

FIG. 1 further depicts coordinates axes X, Y, and Z, which may be utilized as references to aid in identifying relative positions of certain aspects of the tool string 110 or components thereof within three-dimensional space. The X-axis extends in a downhole direction along the central axis 150 of the wellbore 120, and may substantially coincide with the central axis 215 of the laser cutting apparatus 200 during operation of the laser cutting apparatus 200. The Y-axis extends vertically with respect to the Earth and perpendicularly with respect to the X-axis, and the Z-axis extends perpendicularly with respect to the X- and Y-axes.

The laser cutting apparatus 200 is operable to create the radial slots 132 and other radial slots not shown in FIG. 1. The radial slots 132 may be utilized to initiate one or more hydraulic fractures along a plane that is substantially transverse to the central axis 150 of the wellbore 120, such as along the plane defined by the Y- and Z-axes, hereafter referred to as the Y-Z plane. The radial slots 132 may penetrate deep enough into the formation 130 around the wellbore 120 so as to permit the hydraulic fracture(s) to propagate along the Y-Z plane as initiated. As described below, the radial slots 132 may extend through or penetrate the casing 122, the cement sheath 124, and the formation 130 a predetermined depth 152. The predetermined depth 152 may be equal to about twice the wellbore diameter 154, although other radial slot depths are also within the scope of the present disclosure.

Hydrocarbon productivity may be enhanced by forming the radial slots 132 through the formation 130 along a plane substantially transverse to the central axis 150, such as the Y-Z plane. Each radial slot 132 may be of angular sector geometry, circumferentially extending through a predetermined angle around the central axis 150 and the wellbore 120. One or more radial slots 132 may be formed at multiple positions along the wellbore 120 by moving the tool string 110 via the coiled tubing 161, such as for a multi-stage fracturing treatment within a single coiled tubing trip. However, the laser cutting apparatus 200 may also be operable in applications other than hydraulic fracture initiation, including applications in which shallower radial slots may be utilized.

As shown in FIG. 1, the radial slots 132 may be substantially oriented along the direction of gravity. Such orientation may be achieved via utilization of an inclination sensor and/or other orientation sensor(s), such as described above with respect to the second portion 112 of the tool string 110, which may be utilized to measure the direction of gravity relative to the laser cutting apparatus 200. The orientation sensor(s) may also or instead be incorporated into a tool controller (such as the tool controller 220 shown in FIG. 2), which may be operable to communicate signals from the orientation sensor(s) to the wellsite 105 via the electrical conductor 181, although the signals may also or instead be processed by the controller 220. Accordingly, the orientation of the laser cutting apparatus 200 and/or the deflector 250 may be adjusted to form the radial slots 132 in a plane that is substantially coincident with the direction of gravity.

Although FIG. 1 shows the laser cutting apparatus 200 disposed within a horizontal portion of the wellbore 120 to form the radial slots 132 extending along the substantially vertical Y-Z plane, it is to be understood that the laser cutting apparatus 200 may also be utilized to form the radial slots 132 in a vertical or partially deviated portion of the wellbore 120. Because the radial slots 132 may be formed along a plane that is normal or transverse to the central axis 150 of the wellbore 120, the resulting radial slots 132 may be formed along a plane extending substantially horizontally or diagonally with respect to the wellsite 105.

Figure 2:
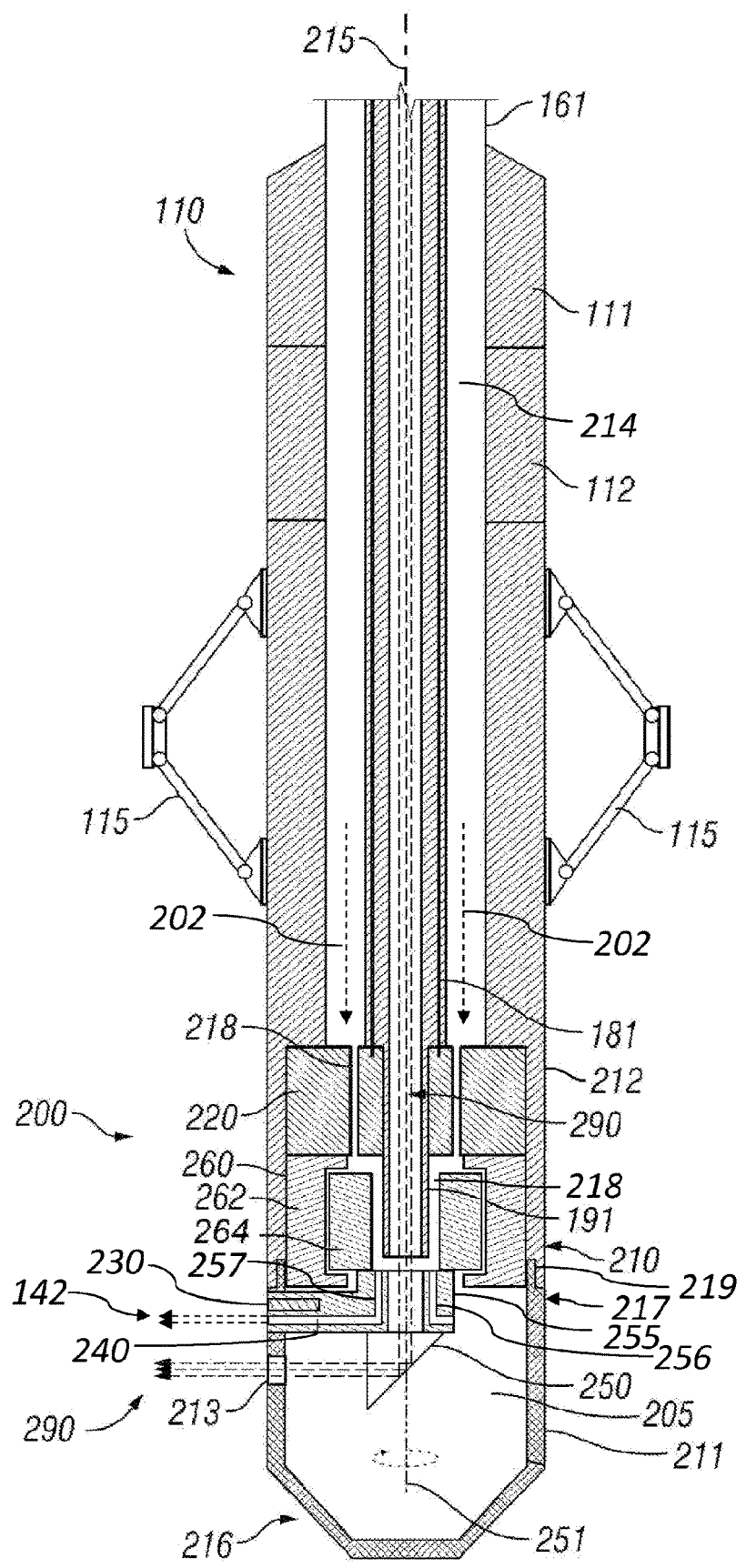
FIG. 2 is a sectional view of an example implementation of a portion of the apparatus shown in FIG. 1 according to one or more aspects of the present disclosure.

FIG. 2 is a sectional view of at least a portion of an example implementation of the tool string 110 shown in FIG. 1 according to one or more aspects of the present disclosure. The following description refers to FIGS. 1 and 2, collectively.

The laser cutting apparatus 200 comprises a housing 210, which defines an internal space 205 and a fluid pathway 214 within the laser cutting apparatus 200. The housing 210 may comprise a first housing section 211 and a second housing section 212. The first housing section 211 may be rotationally coupled with the second housing section 212 in a manner permitting the first housing section 211 to rotate relative to the second housing section 212, such as about the axis of rotation 251, which may substantially coincide with the central axis 215 of the laser cutting apparatus 200 and/or other portions of the tool string 110.

The first housing section 211 may be disposed at the downhole end of the laser cutting apparatus 200, and may comprise a bowl-shaped or other configuration having an open end 217 and a closed end 216. The open end 217 of the first housing section 211 may be rotatably engaged or otherwise coupled with the second housing section 212, such as to permit the above-described rotation of the first housing section 211 relative to the second housing section 212. For example, the open end 217 of the first housing section 211 may be coupled with the second housing section 212 via a sliding joint 219. The closed end 216 of the first housing section 211 may be rounded, sloped, tapered, pointed, beveled, chamfered, and/or otherwise shaped with respect to the central axis 215 of the laser cutting apparatus 200 in a manner that may decrease friction forces between the laser cutting apparatus 200 and the casing 122, the wellbore 120, and/or wellbore fluid as the laser cutting apparatus 200 is conveyed downhole.

The first housing section 211 may enclose internal components of the laser cutting apparatus 200 and/or prevent the wellbore fluid from leaking into the interior space 205 of the laser cutting apparatus 200. The first housing section 211 may further comprise a window 213 that may permit transmission of a laser beam 290 from within the laser cutting apparatus 200 to a region external to the laser cutting apparatus 200. The window 213 may include an optically transparent material, such as glass or a transparent polymer, or the window 213 may be an aperture extending through a sidewall of the first housing section 211. The window 213 may have a substantially circular, rectangular, or other geometry, or may extend circumferentially around the entire first housing section 211.

During cutting operations, the internal space 205 of the first housing section 211 may be filled with the surface fluid communicated through the coiled tubing 161, such as to permit uninterrupted transmission of the laser beam 290 through the internal space 205 and/or to equalize internal pressure of the laser cutting apparatus 200 with hydrostatic wellbore pressure. However, instead of being filled with the surface fluid, the internal space 205 of the first housing section 211 may be filled with gas, such as nitrogen, or may be substantially evacuated (e.g., at a vacuum), among other implementations permitting substantially uninterrupted transmission of the laser beam 290 through the internal space 205.

The second housing section 212 may couple the laser cutting apparatus 200 with the second portion 112 of the tool string 110 or the coiled tubing 161, such as may facilitate communication of the laser beam 290 to the laser cutting apparatus 200. For example, the second housing section 212 may be operable to receive therein or couple with the optical conductor 191 and/or otherwise permits transmission of the laser beam 290 from the laser source 190 to the deflector 250.

The deflector 250 is operable to direct the laser beam 290 through the window 213 of the first housing section 211 to be incident upon intended locations along the casing 122, the cement sheath 124, and/or the formation 130, including via rotation about the axis of rotation 251. For example, the cutting apparatus 200 may comprise a motor 260 operable to rotate the deflector 250 to control the rotational or angular direction or position of the deflector 250. The motor 260 may comprise a stator 262 and a rotor 264. The stator 262 may be fixedly coupled with respect to the second housing section 212, and the rotor 264 may be coupled with or otherwise carry and thus rotate the deflector 250. For example, a body 255 may be coupled with or otherwise rotate with the rotor 264, and the deflector 250 may be coupled with or otherwise carried with the body 255. The body 255 may comprise an optical passage or other opening permitting the laser beam 290 to pass from the optical conductor 191 to the deflector 250.

The deflector 250 is or comprises a light deflecting member operable to direct the laser beam 290 emitted from the optical conductor 191 through the window 213 to be incident upon the casing 122, the cement sheath 124, and/or the formation 130. The deflector 250 may be or comprise a lens, a prism, a mirror, or another light deflecting member. Although depicted as a single light deflecting member, the deflector 250 may comprise two or more prisms or mirrors, or the deflector 250 may comprise a rhomboid prism, among other example implementations within the scope of the present disclosure.

Instead of the first housing section 211 being rotatable, the first housing section 211 may be or comprise a non-rotatable protection cover fixedly coupled with the second housing section 212. In such implementations, the sliding joint 219 may not exist, and the first housing section 211 may instead be fixedly connected with the second housing section 212 via a threaded joint or other connection means. Such implementations of the first housing section 211 may also not comprise the window 213 or other openings transparent to the laser beam 290, but may instead comprise a material (e.g., aluminum) may be cut by the laser beam 290.

During cutting operations in which one or more radial slots are to be formed at different depths within the wellbore 120, the laser cutting apparatus 200 may be conveyed to the deepest position within the wellbore 120 at which radial slots 132 are to be formed such that the deepest one or more slots 132 are formed first, and then the next deepest slots 132, and so on. However, before the first (deepest) slots are formed, the laser beam 290 may be activated and the deflector 250 may be rotated through 360 degrees to cut off at least a portion (e.g., an end portion) of the first housing section 211, which then falls off into the wellbore 120. The laser beam 290, directed by the deflector 250, may then be utilized to form the first set of radial slots 132. Thereafter, the tool string 110, including the laser cutting apparatus 200, may be moved along the wellbore 120 in the uphole direction until the laser cutting apparatus 200 is positioned at the next predetermined location at which another set of radial slots 132 are to be formed.

The above-described process may be repeated until each of the intended radial slots 132 are created, and the laser cutting apparatus 200 may then be removed from the wellbore 120. Limiting the amount of movement of the laser cutting apparatus 200 after the end portion of the first housing section 211 is cut off, especially movement in the downhole direction, may prevent or minimize contact between the deflector 250 and the side of the wellbore 120 or other obstacles in the wellbore 120, such as may prevent or minimize damage to the deflector 250 that might otherwise occur if the laser cutting apparatus 200 is moved in the downhole direction after the end portion is cut off.

It is to be understood that the cutting operations described above are also applicable to implementations of the laser cutting apparatus 200 comprising the rotatable first housing section 211. However, because the rotatable housing section 211 is not cut off, the deflector 250 and other components are continuously covered, permitting the laser cutting apparatus 200 to be more readily moved in the downhole direction through the wellbore 120 without risking damage.

The second housing section 212 may also couple the laser cutting apparatus 200 with the second portion 112 of the tool string 110 or the coiled tubing 161, such as may facilitate communication of the surface fluid from the coiled tubing 161 to the laser cutting apparatus 200. For example, the second housing section 212 may be operable to receive therein or couple with the coiled tubing 161 to direct the surface fluid along the fluid pathway 214 into the laser cutting apparatus 200, as indicated in FIG. 2 by arrows 202. Thereafter, the surface fluid may be directed by additional fluid pathways 218 toward the body 255, which may direct the surface fluid into the internal space 205 and/or out of the laser cutting apparatus 200. The body 255 comprises a fluid pathway 256 directing the surface fluid from the fluid pathway 218 into the internal space 205. At least a portion of the body 255 may extend radially outwards through the first housing section 211, and this or another portion of the body 255 comprises a fluid pathway 257 directing the surface fluid from the fluid pathway 218 to outside the first housing section 211. The fluid pathway 257 may terminate with a fluid nozzle 240 and/or other means operable to form a stream 142 of surface fluid expelled from the fluid pathway 257. Although the nozzle 240 is depicted in FIG. 2 as being flush with the exterior of the first housing section 211, the nozzle 240 may also protrude outward from the exterior of the first housing section 211.

The body 255 may operatively couple the rotor 264 and the first housing section 211, such as may permit the motor 260 to rotate the first housing section 211. The connection between the body 255 and the rotor 264 further permits the motor 260 to simultaneously rotate the deflector 250 and direct the nozzle 240 in the same direction. That is, the nozzle 240 and the deflector 250 may be angularly aligned, relative to rotation around the axis 251, such that the nozzle 240 may direct the fluid stream 142 in substantially the same direction that the deflector 250 directs the laser beam 290 (e.g., within about five degrees from each other). For example, the nozzle 240 may be operable to discharge the fluid stream 142 along a radial path that substantially overlaps or coincides with a radial path of the laser beam 290. Accordingly, the fluid stream 142 may impact a portion of the formation 130 that is being cut by the laser beam 290 to flush out formation particles, dust, fumes, and/or other contaminants (hereafter collectively referred to as contaminants) generated during cutting operations. The fluid stream 142 may also displace contaminants and wellbore fluid from the region generally defined by the path of the laser beam 290 extending from the laser cutting apparatus 200 and into the formation 130, such as may aid in preventing the contaminants and wellbore fluid from diffusing or otherwise interfering with the laser beam 290.

The surface fluid communicated from the fluid source 140 via the coiled tubing 161 and expelled through the nozzle 240 is substantially transparent to the laser beam 290. For example, the surface fluid may comprise nitrogen, water with an appropriate composition and salinity, and/or another fluid that does not deleteriously interfere with the laser beam 290. The fluid composition may depend on the wavelength of the laser beam 290. For example, the spectrum of absorption of water for infrared light may have some wavelength intervals where water is substantially transparent to the laser beam 290. Accordingly, the laser cutting apparatus 200 may be operable to emit the laser beam 290 having a wavelength that may be transmitted through the water with little or no interference.

The laser cutting apparatus 200 may further comprise a depth sensor 230 operable to monitor the depth of the radial slots 132 being formed by the laser beam 290. The depth sensor 230 may be operatively connected with the motor 260, such as may permit the motor 260 to control the angular position of the depth sensor 230 in an intended direction to measure the depth of the radial slots 132. For example, the depth sensor 230 may be coupled with or otherwise carried by the body 255. The depth sensor 230 and the deflector 250 may be angularly aligned, relative to rotation around the axis 251, such that a sensing direction of the depth sensor 230 and the direction of the laser beam 290 deflected by the deflector 250 may be substantially similar (e.g., within about five degrees of each other). Thus, the depth sensor 230 may be operable to detect the depth of the radial slot 132 in real-time as the radial slot 132 is being cut by the laser beam 290.

For example, the depth sensor 230 may be operable to emit a sensor signal into the radial slot 132 along a path that substantially coincides with the path of the laser beam 290. The depth sensor 230 may receive the sensor signal that is reflected back by the uncut portion of the formation 130. The depth sensor 230 and/or another portion of the tool string 110 may be operable to calculate or determine the depth of the radial slot 132 based on travel duration of the sensor signal, such as between a first time at which the sensor signal is emitted from the depth sensor 230 and a second time at which the depth sensor 230 receives the reflected sensor signal.

The controller 220 may be connected with the electrical conductor 181 for transmitting and/or receiving electrical signals communicated between the controller 220 and the control and power center 180. The controller 220 may be operable to receive, process, and/or record the signals or information generated by and/or received from the control and power center 180, various components of the laser cutting apparatus 200, and/or the first and second portions 111, 112 of the tool string 110. For example, the controller 220 may be operable to receive and process signals from the CCL and/or orientation sensor(s) described above, such as to acquire the position and/or the orientation of the laser cutting apparatus 200. The controller 220 may be further operable to transmit the acquired position and/or orientation information to the control and power center 180 via the electrical conductor 181.

The controller 220 may also be operable to receive, store, and/or execute computer programs or coded instructions, such as may cause the laser cutting apparatus 200 and/or other components of the tool string 110 to perform at least a portion of a method and/or process described herein. The controller 220 may be programmed or otherwise receive the coded instructions at the wellsite 105 prior to conveying the laser cutting apparatus 200 within the wellbore 120. The controller 220 may be programmed with information related to location, geometry, and other parameters related to formation of the radial slots 132, such as the number and orientation of the radial slots 132 with respect to the central axis 150 of the wellbore 120 and/or the direction of gravity. The controller 220 may be programmed such that each radial slot 132 or set of radial slots 132 may comprise a unique (e.g., different) predefined geometry. Based on such information or programming, the controller 220 may be operable to control the laser cutting apparatus 100, including extending the anchoring device 115, activating the laser source 190 (or indicating a "ready" status therefor), and rotating the motor 260 to control the angular position of the deflector 250, the nozzle 240, and/or the depth sensor 230. Therefore, the controller 220 and/or the programming may facilitate a substantially automatic radial slot 132 formation process, perhaps with no or minimal communication with the control and power center 180 while the laser cutting apparatus 200 remains at certain depth within the wellbore 120 during formation of the radial slot(s) 132 at that depth.

The radial slots 132 created by the laser cutting apparatus 200 may comprise a continuous or substantially continuous 360-degree slot that extends through the casing 122 and the cement sheath 124 and into the formation 130 surrounding the wellbore 120, along the plane substantially transverse to the central axis 150, such as the Y-Z plane. The radial slots 132 may also comprise a set of discontinuous (i.e., discrete) radial slots that extend through the casing 122 and the cement sheath 124 and into the formation 130 surrounding the wellbore 120, along the plane substantially transverse to the central axis 150, such as the Y-Z plane. Although not extending a full 360-degrees, such discontinuous pattern of radial slots 132 may be utilized to initiate or assist in initiating a transverse fracture with respect to the central axis 150. The discontinuous pattern of the radial slots 132 may be operable to maintain the mechanical integrity of the casing 122 by avoiding a full severing of the casing 122 around its circumference, such that the casing 122 may be cut less than 360-degrees around its circumference.

Figure 3:
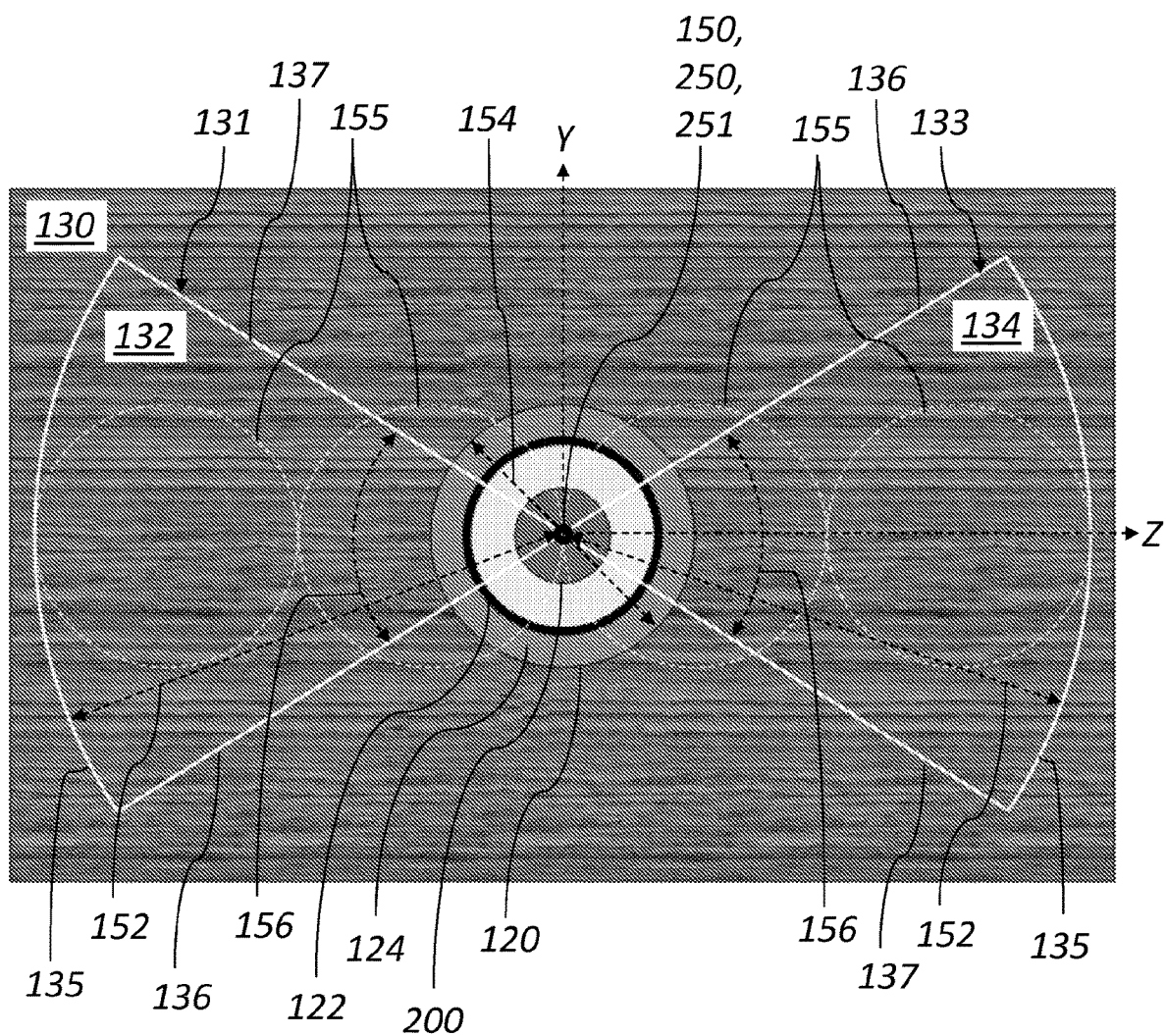
FIG. 3 is a schematic view of an example implementation of a portion of the apparatus shown in FIG. 1 according to one or more aspects of the present disclosure.

FIG. 3 is a schematic view of a portion of the laser cutting apparatus 200 shown in FIGS. 1 and 2 disposed within the horizontal portion of the wellbore 120 prior to initiating cutting operations according to one or more aspects of the present disclosure. As described above and depicted in FIG. 3, the laser cutting apparatus 200 may be disposed within the wellbore 120 such that the axis of rotation 251 of the deflector 250 substantially coincides with the central axis 150 of the wellbore 120. The laser cutting apparatus 200 is depicted in FIG. 3 prior to forming radial slots 132, 134 having geometries defined by profiles 131, 133, respectively. The radial slots 132, 134 may extend symmetrically on opposing sides of the wellbore 120 along the Y-Z plane, extending substantially transverse with respect to the central axis 150 of the wellbore 120 and substantially vertically or parallel to the direction of gravity. Each radial slot 132, 134 may extend through the casing 122, the cement sheath 124, and into the formation 130 through a predetermined angle 156, which in the example implementation depicted in FIG. 3 is about sixty degrees. Each radial slot 132, 134 may terminate along opposing first and second sides 136, 137, which are separated by the predetermined angle 156. Each radial slot 132, 134 may extend to the predetermined depth 152 measured between the central axis 150 and a radially outward end 135 of each radial slot 132, 134. The predetermined depth 152 of each radial slot 132, 134 may be about twice the wellbore diameter 154. FIG. 3 also shows a plurality of circular profiles 155, each having a diameter that is substantially equal to the wellbore diameter 154, superimposed over each radial slot profile 131, 133 to visually demonstrate the geometric relationship between the wellbore diameter 154 and the predetermined depth 152 of the radial slots 132, 134. The circular profiles 155 show that the predetermined depth 152 of each radial slot 132, 134 is twice the wellbore diameter 154.

Although FIG. 3 depicts two radial slot profiles 131, 133 extending through the casing 122, the cement sheath 124, and the formation 130, it is to be understood that other radial slot configurations are also within the scope of the present disclosure. For example, other radial slot configurations may include three, four, five, or more radial slots. Furthermore, although the depicted radial slot profiles 131, 133 extend through the predetermined angle 156 of about sixty degrees, other values of the predetermined angle 156 within the scope of the present disclosure may range between about ten degrees and about 120 degrees. Moreover, it is to be understood that the laser cutting apparatus 200 may be operable to form radial slots ranging from a single perforation comprising a width of the laser beam 290 to a radial slot extending 360 degrees around the central axis 150.

Figure 4:
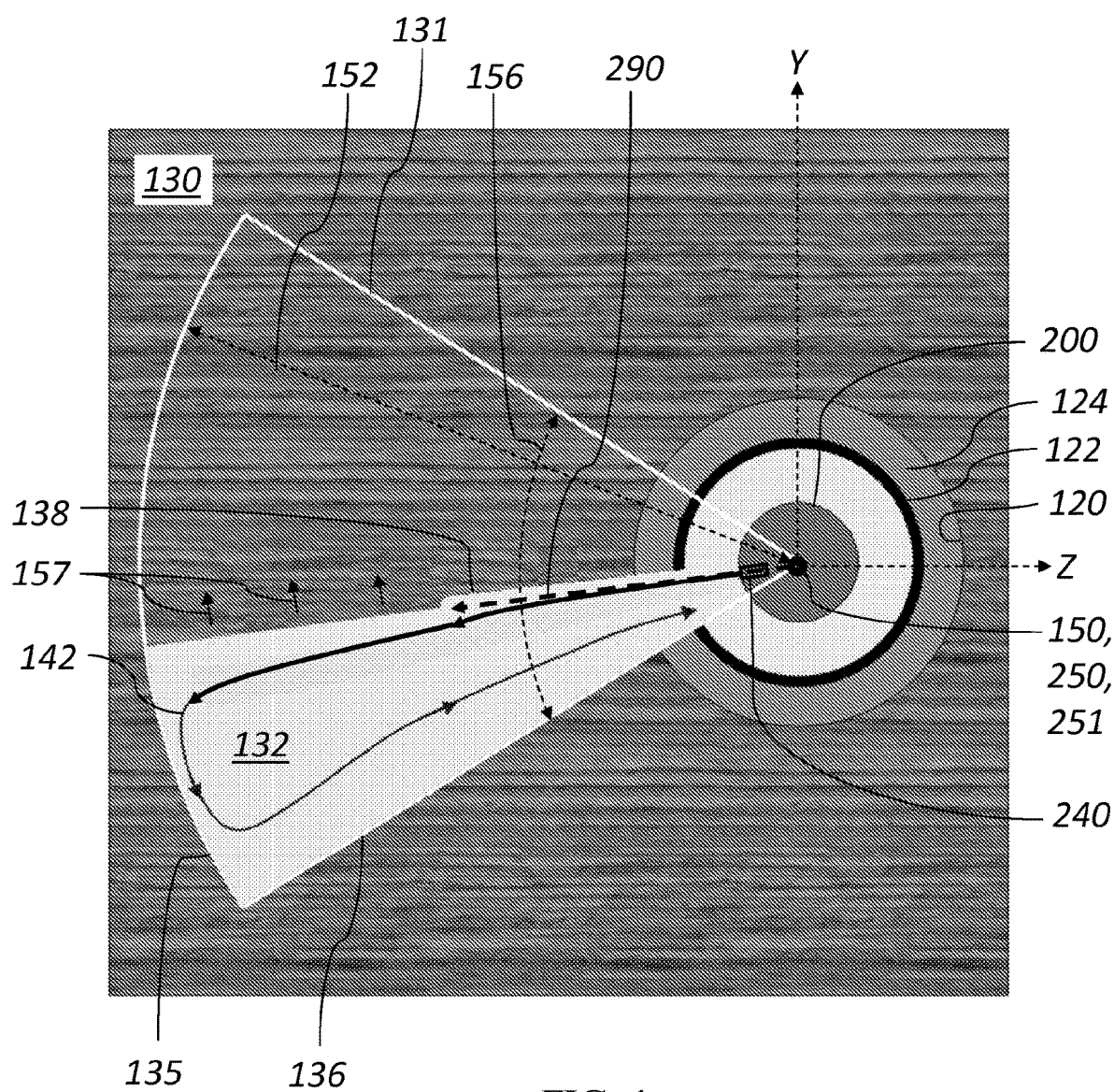
FIG. 4 is a schematic view of the apparatus shown in FIG. 3 during operation according to one or more aspects of the present disclosure.

FIG. 4 depicts an example implementation of the formation of the radial slot 132 shown in FIG. 3 in which the laser cutting apparatus 200 is forming the radial slot 132 according to the geometry defined by the profile 131 described above. The laser cutting apparatus 200 is forming the radial slot 132 by operating the motor 260 to sequentially rotate the deflector 250 to each one of a plurality of angular positions, relative to rotation around the axis 251, and maintain the deflector 250 at each successive one of the plurality of angular positions until the laser beam 290 penetrates the formation 130 to the predetermined depth 152 at that angular position. That is, the motor 260 is controlled to maintain the deflector 250 at an angular position until the laser beam 290 penetrates the formation 130 to the predetermined depth 152, then the motor 260 is controlled to rotate the deflector 250 to the next (adjacent) angular position and maintain the deflector 250 at that angular position until the laser beam 290 again penetrates the formation 130 to the predetermined depth 152, and this process is repeated until the radial slot 132 extends through the predetermined angle 156 encompassing the plurality of angular positions.

For example, the motor 260 may maintain the deflector 250 at a first angular position until the laser beam 290 penetrates the casing 122, the cement sheath 124, and the formation 130 to the predetermined depth 152, thus forming a first, angularly-incremental cut or perforation 138. After the angularly-incremental perforation 138 is finished, the motor 260 may be actuated to change the angular position of the deflector 250 by an incremental angle to a second (adjacent) angular position where the motor 260 again maintains the deflector 250 until the laser beam 290 again penetrates the casing 122, the cement sheath 124, and the formation 130 to the predetermined depth 152. Such steps may be repeated until the angularly-incremental perforations 138 collectively form the radial slot 132 through the predetermined angle 156. In FIG. 4, arrows 157 depict such progression of the angularly-incremental formation of the radial slot 132.

Each of the plurality of angular positions may be angularly offset from neighboring angular positions by an angular increment corresponding to a width of the laser beam 290. For example, at each of the plurality of angular positions, the laser beam 290 may ultimately reach a location at the radial outward end 135 of the radial slot, and the distance between neighboring ones of such locations may be substantially equal to the width of the laser beam 290.

FIG. 4 also depicts the fluid stream 142 discharged by the nozzle 240 and circulating within a formed portion of the radial slot 132. As described above, the nozzle 240 and the deflector 250 may be substantially aligned in a manner permitting the fluid stream 142 to impact the portion of the formation 130 being cut by the laser beam 290. Such alignment of the nozzle 240 and the deflector 250 may also permit the fluid stream 142 to initially substantially overlap or coincide with the path of the laser beam 290 (although such overlap is minimized in the example depicted in FIG. 4 so that the path of the laser beam 290 is visible). During cutting operations, the path of the fluid stream 142 initially flowing in a radially outward direction may thus wash away or otherwise move contaminants away from the path of the laser beam 290, such as may prevent or reduce scattering of the laser beam 290. The fluid stream 142 then returns along or towards the first side 136 of the radial slot 132 and/or other previously formed portions of the radial slot 132.

Figure 5:
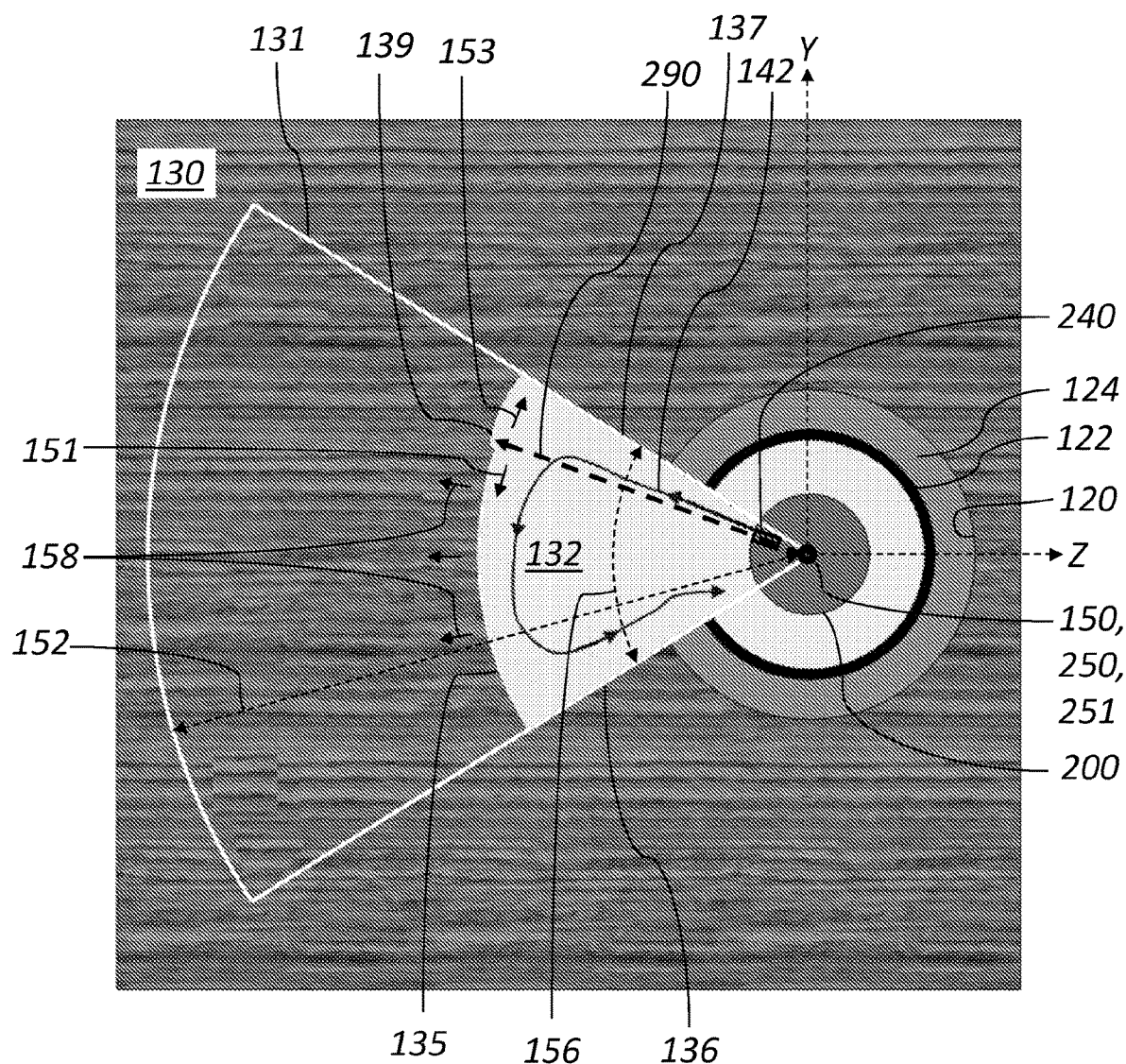
FIG. 5 is a schematic view of the apparatus shown in FIG. 3 during operation according to one or more aspects of the present disclosure.

FIG. 5 depicts another example implementation of the formation of the radial slot 132 shown in FIG. 3 utilizing the laser cutting apparatus 200. However, instead of forming angularly-incremental cuts or penetrations each extending along the entire predetermined depth 152 of the radial slot 132, FIG. 5 depicts the radial slot 132 formed by a plurality of radially-incremental cuts or perforations 139 that each extend through the predetermined angle 156. During such cutting operations, the motor 260 is controlled to repeatedly rotate the deflector 250 through a plurality of cycles, wherein each cycle comprises a first substantially continuous rotation of the deflector 250 through the predetermined angle 156 in a first rotational direction, indicated in FIG. 5 by arrow 151, and a second substantially continuous rotation of the deflector 250 through the predetermined angle 156 in a second rotational direction, indicated in FIG. 5 by arrow 153. Thus, each successive performance of a cycle (or half-cycle) extends the entire radial slot 132, throughout the predetermined angle 156, closer to the predetermined depth 152.

During each pass (e.g., half of each cycle), the laser beam 290 forms the radially-incremental cut or perforation 139 extending an incremental distance in the radial direction and along the entire predetermined angle 156 of the radial slot 132. With each subsequent pass, the depth of the radial slot 132 increases, until the radial slot 132 reaches the predetermined depth 152. The direction of progression of the radial slot 132 thus formed is indicated in FIG. 5 by arrows 158.

FIG. 5 further shows the fluid stream 142 discharged by the nozzle 240 and circulating within the previously formed portion of the radial slot 132. As described above, the nozzle 240 and the deflector 250 may be substantially aligned in a manner permitting the fluid stream 142 to impact the portion of the formation 130 being cut by the laser beam 290. Such alignment may permit the fluid stream 142 to initially substantially overlap or coincide with the path of the laser beam 290. Thus, the initial path of the fluid stream 142 may wash away or otherwise move contaminants away from the path of the laser beam 290, such as may prevent or reduce scattering of the laser beam 290 during the cutting operations. The fluid stream 142 may then return along a previously formed portion of the radial slot 132 away from the laser beam 290, such as along and/or towards the first side 136 of the radial slot 132 when the deflector 250 is rotating in direction 153 and along and/or towards the second side 137 of the radial slot when the deflector 250 is rotating in direction 151.

A passage for the fluid stream 142 to enter and exit the radial slot 132 may be wider and/or exist earlier in operations when forming the radially-incremental perforations 139 along the entire predetermined angle 156, relative to the formation of such passage when forming the angularly-incremental perforations 138 described above with respect to FIG. 4. Such wider and/or earlier-formed passage may permit greater separation between inward- and outward-flowing portions of the fluid stream 142, which may aid in cleaning contaminants away from the path of the laser beam 290.

Figure 6:
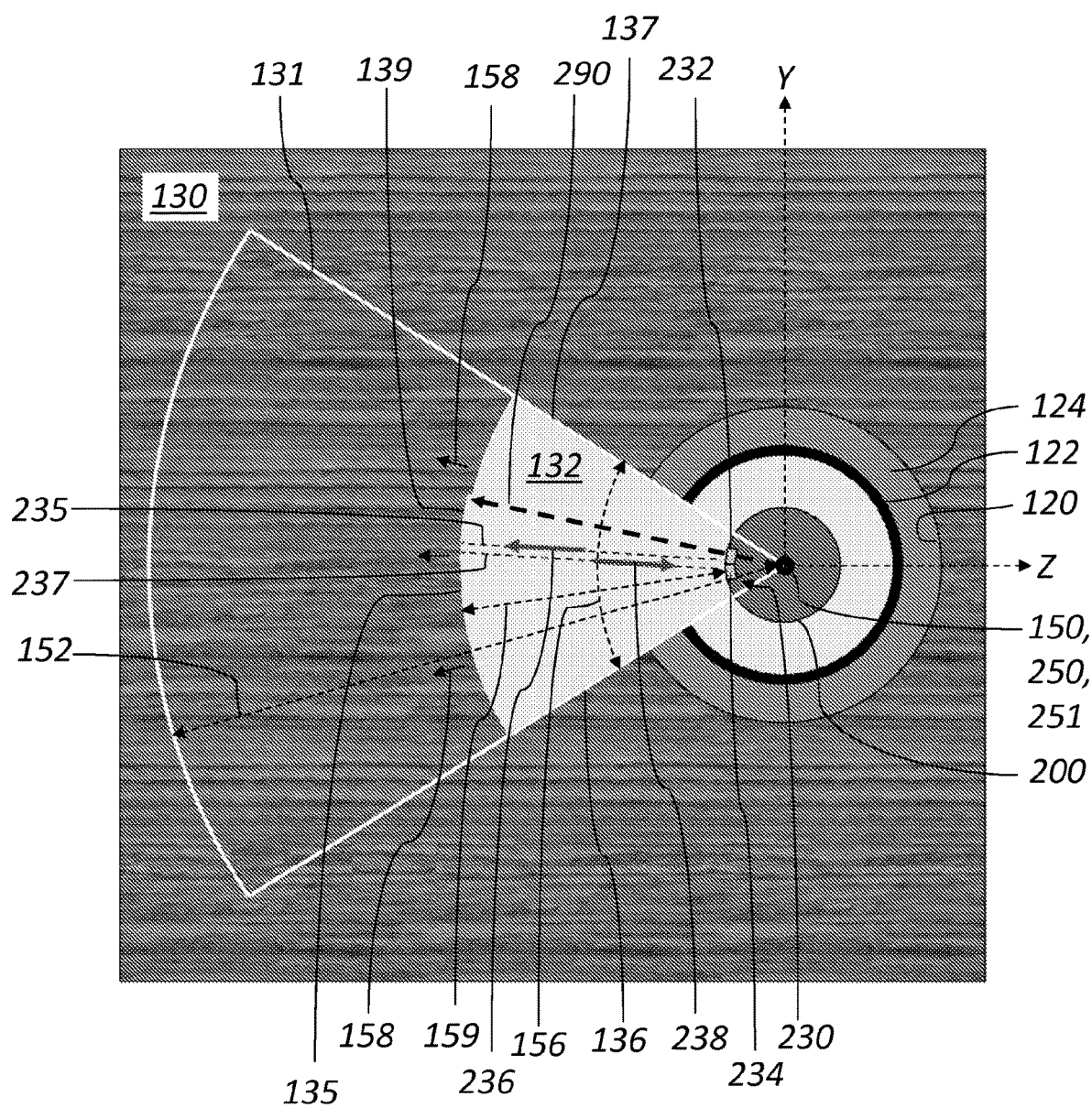
FIG. 6 is a schematic view of the apparatus shown in FIG. 3 during operation according to one or more aspects of the present disclosure.

FIG. 6 is another schematic view of FIG. 5 demonstrating that a penetration depth 159 may be monitored as the radial slot 132 progresses in the radially outward direction toward the predetermined depth 152. The penetration depth 159 may be monitored in real-time by the depth sensor 230 while the radial slot 132 is being formed. For example, the depth sensor 230 may comprise a signal emitter 232 operable to emit a signal 235 directed toward the outward end 135 of the radial slot 132, as indicated by arrow 236. The depth sensor 230 may further comprise a signal receiver 234 operable to receive a returning signal 237 after the emitted signal 235 is reflected back by the uncut formation at the outward end of the radial slot 132, as indicated by arrow 238. The depth sensor 230 may be operable to calculate or determine the penetration depth 159 of the radial slot based on a duration of travel of the signal 235, 237 between the emitter 232 and the receiver 234. However, the controller 220 may also or instead be utilized to determine the penetration depth 159 of the radial slot 132. For example, the depth sensor 230 may be in communication with the controller 220, such as to initiate emission of the signal 235 by the controller 220 and to receive the information generated by the depth sensor 230. Once the signal 235, 237 is transmitted and received, the controller 220 may be operable to determine the penetration depth 159 of the radial slot 132 based on the received signal 237 or based on the duration of travel of the signal 235, 237 from the emitter 232 to the receiver 234. The penetration depth 159 into the formation 130 may be measured at least once during each cycle of the deflector 250.

The depth sensor 230 may be an acoustic sensor operable to emit an acoustic signal into the radial slot 132 and detect reflection of the acoustic signal from the outward end 135 of the radial slot 132. The depth sensor 230 may also be an electromagnetic sensor operable to emit an electromagnetic signal into the radial slot 132 and detect reflection of the electromagnetic signal from the outward end 135 of the radial slot 132. The depth sensor 230 may also be a light sensor operable to emit a light signal into the radial slot 132 and detect reflection of the light signal from the outward end 135 of the radial slot 132.

As described above, although not as illustrated in FIG. 6, the depth sensor 230 and the deflector 250 may be substantially aligned in a manner permitting the emitted signal 235 and/or a detection direction of the depth sensor 230 to substantially coincide with the laser beam 290. As also described above, the depth sensor 230 and the deflector 250 may be operatively coupled with the motor 260, such that the deflector 250 and the depth sensor 230 may rotate together. However, as shown in FIG. 6, the laser beam 290 and depth sensor 230 (and, thus, the direction of the sensor signals 235, 237) may instead be angularly offset to permit the depth sensor 230 to measure the depth of the radial slot 132 at a location that is angularly offset from the laser beam 290, such as to reduce interference caused by the laser beam 290 and/or contaminants generated by the laser beam 290.

The depth sensor 230 may also be a light sensor operable to detect reflection of a portion of the laser beam 290 reflected from the outward end 135 of the radial slot 132. For example, the laser beam 290 may be periodically interrupted and pulsed at predetermined times during the laser cutting operations while the depth sensor 230 detects at least a portion of the laser beam 290 reflected back by the outward end 135 of the radial slot 132 being formed. The depth sensor 230 and/or the controller 220 may then perform the duration of travel calculations to determine the penetration depth 159.

After the penetration depth 159 is known, the controller 220 may be operable to cause the motor 260 to rotate the deflector 250 based on the determined penetration depth 159. For example, the controller 220 may be operable to slow down the motor 260 to decrease angular velocity of the deflector 250 and, thus, decrease the angular velocity of the laser beam 290. Such decrease may be based on the determined penetration depth 159 to, for example, deliver a substantially constant amount of laser energy per unit length of the formation 130 being cut. For example, as the penetration depth 159 and length of the outward end 135 of the radial slot 132 increase, the rotational rate of the defector 250 laser beam cycle rate may be proportionally or otherwise decreased to permit the laser beam 290 to maintain the substantially constant amount of laser energy delivered by the laser beam 290 per unit length of the outward end 135 of the radial slot 132 being formed.

FIG. 6 shows the depth sensor 230 being utilized while the laser cutting apparatus 200 forms the radial slot 132 by forming the plurality of radially-incremental perforations 139 extending along the entire predetermined angle 156, as described above with respect to FIG. 5. However, the depth sensor 230 may also be utilized to measure the penetration depth 159 while the radial slots 132 are formed by forming the plurality of angularly-incremental perforations 138 each extending to the predetermined depth 152, as described above with respect to FIG. 4. For example, as the motor 260 directs the deflector 250 to a predetermined angular position to form an angularly-incremental perforation 138, the motor 260 may simultaneously direct the depth sensor 230 to the predetermined angular position to monitor in real-time the penetration depth 159 of the angularly-incremental perforation 138 as it is being formed. After the controller 220 determines that the penetration depth 159 is substantially equal to the predetermined depth 152, via utilization of information received from the depth sensor 230, the controller 220 may cause the motor 260 to change the angular position of the laser beam 290 by the incremental angle to form the next angularly-incremental perforation 138. Such steps may be repeated until the radial slot 132 extends through the predetermined angle 156. Because each angularly-incremental perforation 138 is narrow (e.g., generally the width of the laser beam 290), the depth sensor 230 and the deflector 250 may be aligned such that the sensor signal 235 and the laser beam 290 substantially align or coincide.

Figure 7:
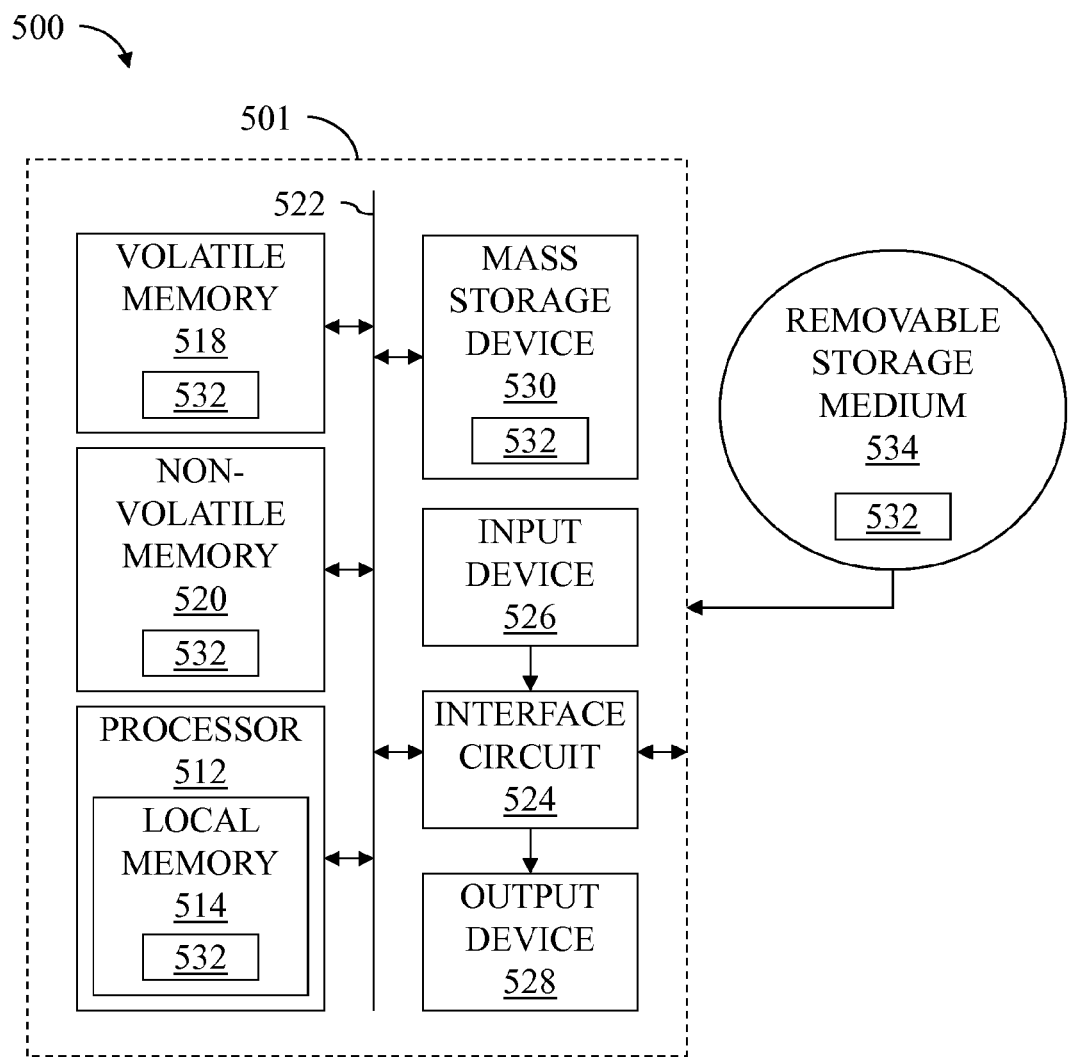
FIG. 7 is a schematic view of at least a portion of an example implementation of apparatus according to one or more aspects of the present disclosure.

FIG. 7 is a schematic view of at least a portion of an example implementation of an apparatus 500 according to one or more aspects of the present disclosure. The apparatus 500 may be or form a portion of the control and power center 180 shown in FIG. 1 and/or the controller 220 shown in FIG. 2, and may thus be operable to form at least a portion of a method and/or process according to one or more aspects described above, including for and/or during the formation of radial slots 132, 134 in a formation 130.

The apparatus 500 is or comprises a processing system 501 that may execute example machine-readable instructions to implement at least a portion of one or more of the methods and/or processes described herein. The processing system 500 may be or comprise, for example, one or more processors, controllers, special-purpose computing devices, servers, personal computers, personal digital assistant (PDA) devices, smartphones, smart glasses, tablets, internet appliances, and/or other types of computing devices.

The processing system 501 may comprise a processor 512 such as, for example, a general-purpose programmable processor. The processor 512 may comprise a local memory 514, and may execute coded instructions 532 present in the local memory 514 and/or another memory device. The processor 512 may execute, among other things, machine-readable instructions or programs to implement the methods and/or processes described herein. The programs stored in the local memory 514 may include program instructions or computer program code that, when executed by an associated processor, control formation of radial slots 132, 134 in a formation 130. The processor 512 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families are also appropriate.

The processor 512 may be in communication with a main memory, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 520 may be, comprise, or be implemented by read-only memory, flash memory and/or other types of memory devices. One or more memory controllers (not shown) may control access to the volatile memory 518 and/or the non-volatile memory 520.

The processing system 501 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, a satellite interface, a global positioning system (GPS) and/or a cellular interface or receiver, among others. The interface circuit 524 may also comprise a graphics driver card. The interface circuit 524 may also comprise a device such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 526 may be connected to the interface circuit 524. The input device(s) 526 may permit a user to enter data and commands into the processor 512. The input device(s) 526 may be, comprise, or be implemented by, for example, a keyboard, a mouse, a touchscreen, a track-pad, a trackball, an isopoint, and/or a voice recognition system, among others.

One or more output devices 528 may also be connected to the interface circuit 524. The output devices 528 may be, comprise, or be implemented by, for example, display devices (e.g., a light-emitting diode (LED) display, a liquid crystal display (LCD, or a cathode ray tube (CRT) display, among others), printers, and/or speakers, among others.

The processing system 501 may also comprise one or more mass storage devices 530 for storing machine-readable instructions and data. Examples of such mass storage devices 530 include floppy disk drives, hard drive disks, compact disk (CD) drives, and digital versatile disk (DVD) drives, among others. The coded instructions 532 may be stored in the mass storage device 530, the volatile memory 518, the non-volatile memory 520, the local memory 514, and/or on a removable storage medium 534, such as a CD or DVD. Thus, the modules and/or other components of the processing system 501 may be implemented in accordance with hardware (embodied in one or more chips including an integrated circuit such as an ASIC), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

In view of the entirety of the present disclosure, including the figures and the claims, a person having ordinary skill in the art should readily recognize that the present disclosure introduces an apparatus comprising: a laser cutting apparatus conveyable within a casing lining at least a portion of a wellbore that extends into a subterranean formation, wherein the laser cutting apparatus comprises: a housing; a deflector operable for rotation relative to the housing to direct a laser beam to form a radial slot extending through the casing and into the subterranean formation; a motor operable to rotate the deflector; a sensor operable to generate information related to depth of the radial slot in real-time as the radial slot is formed by the laser beam; and a processing device operable to receive the information generated by the sensor and cause the motor to rotate the deflector based on the received information.

The laser cutting apparatus may further comprise a body connected to and rotatable by operation of the motor, and the deflector and the sensor may each be connected to and rotate with the body.

The sensor may be a light sensor operable to detect reflection of a portion of the laser beam from an end of the radial slot. The processing device may be further operable to determine the depth of the radial slot in real-time based on time of travel of the laser beam from the deflector to the light sensor.

The sensor may be an acoustic sensor operable to emit an acoustic signal into the radial slot and detect reflection of the acoustic signal from an end of the radial slot.

The sensor may be an electromagnetic sensor operable to emit an electromagnetic signal into the radial slot and detect reflection of the electromagnetic signal from an end of the radial slot.

The sensor may comprise a signal emitter and a signal receiver. The signal emitter may be operable to emit a signal into the radial slot, and the signal receiver may be operable to receive the signal reflected by an end of the radial slot. The processing device may be further operable to determine the depth of the radial slot in real-time based on a duration of travel of the signal between the emitter and the receiver.

The deflector may be in optical communication with a laser source located at a wellsite surface from which the wellbore extends.

The wellbore extends from a wellsite surface, and the laser cutting apparatus may be conveyable within the casing via coiled tubing operable to communicate a fluid from the wellsite surface to the laser cutting apparatus. The fluid may be substantially transparent to the laser beam. The deflector may be operable to direct the laser beam along a first radial path, and the laser cutting apparatus may further comprise a nozzle operable to discharge the fluid along a second radial path that at least partially overlaps the first radial path. At least a portion of the second radial path may substantially coincide with the first radial path. The laser cutting apparatus may further comprise a body connected to and rotatable by operation of the motor, and the deflector and the nozzle may each be connected to and rotate with the body.

A depth of the radial slot may be at least twice the diameter of the wellbore, measured from a central axis of the wellbore.

The radial slot may extend along a plane substantially perpendicular to a central axis of the wellbore. The plane may be substantially parallel to the direction of gravity.

The apparatus may further comprise: a laser source located at a wellsite surface from which the wellbore extends; and an optical conductor conducting the laser beam from the laser source to the deflector.

The present disclosure also introduces a method comprising: conveying a laser cutting apparatus within a casing lining at least a portion of a wellbore that extends into a subterranean formation; transmitting a laser beam to a deflector of the laser cutting apparatus; and operating a motor of the laser cutting apparatus to control rotation of the deflector, thus directing the laser beam deflected by the deflector to form a radial slot extending through the casing to a predetermined depth within the subterranean formation, including operating the motor to sequentially rotate the deflector to each one of a plurality of angular positions and maintain the deflector at each successive one of the plurality of angular positions until the laser beam penetrates the subterranean formation to a predetermined depth at that angular position, such that the radial slot extends through a predetermined angle encompassing the plurality of angular positions.

Each of the plurality of angular positions may correspond to a width of the laser beam.

Conveying the laser cutting apparatus within the casing may be via coiled tubing.

Transmitting the laser beam to the deflector may comprise transmitting the laser beam from a laser source located at a wellsite surface from which the wellbore extends.

The predetermined depth may be at least twice a diameter of the wellbore, measured from a central axis of the wellbore.

The wellbore extends from a wellsite surface. Conveying the laser cutting apparatus within the casing may be via coiled tubing, and the method may further comprise communicating a fluid from the wellsite surface to the laser cutting apparatus via the coiled tubing. The fluid may be substantially transparent to the laser beam. The deflector may be operable to direct the laser beam along a first radial path at each of the plurality of angular positions. The method may further comprise discharging the fluid from a nozzle of the laser cutting apparatus along a second radial path at each of the plurality of angular positions. The second radial path may at least partially overlap the first radial path.

The method may further comprise measuring a penetration depth of the laser beam into the subterranean formation in real-time at each of plurality of angular positions. Measuring the penetration depth may comprise: emitting a signal into the radial slot; receiving the signal reflected by an end of the radial slot; and determining depth of the radial slot based on a duration of travel of the signal. Measuring the penetration depth may utilize a light sensor, an acoustic sensor, and/or an electromagnetic sensor.

The present disclosure also introduces a method comprising: conveying a laser cutting apparatus within a casing lining at least a portion of a wellbore that extends into a subterranean formation; transmitting a laser beam to a deflector of the laser cutting apparatus; and operating a motor of the laser cutting apparatus to repeatedly rotate the deflector through a plurality of cycles, wherein each of the plurality of cycles comprises a first substantially continuous rotation of the deflector through a predetermined angle in a first rotational direction and a second substantially continuous rotation of the deflector through the predetermined angle in a second rotational direction, thus directing the laser beam deflected by the deflector to form a radial slot extending radially through the casing and, with each successive one of the plurality of cycles, extend the radial slot to a predetermined depth within the subterranean formation, such that opposing first and second sides of the radial slot are angularly disposed at the predetermined angle.

Operating the motor may further comprise decreasing angular velocity of the first and second substantially continuous rotations of the deflector during one or more of the plurality of cycles. The angular velocity of the first and second substantially continuous rotations of the deflector may be decreased during one or more of the plurality of cycles by an amount permitting the laser beam to deliver a substantially constant amount of energy per unit length of the subterranean formation being cut at a penetration depth of the laser beam in that one of the plurality of cycles.

Conveying the laser cutting apparatus within the casing may be via coiled tubing.

Transmitting the laser beam to the deflector may comprise transmitting the laser beam from a laser source located at a wellsite surface from which the wellbore extends.

The predetermined depth may be at least twice a diameter of the wellbore, measured from a central axis of the wellbore.

The wellbore extends from a wellsite surface. Conveying the laser cutting apparatus within the casing may be via coiled tubing, and the method may further comprise communicating a fluid from the wellsite surface to the laser cutting apparatus via the coiled tubing. The fluid may be substantially transparent to the laser beam. The deflector may be operable to direct the laser beam along a first radial path as the deflector is moved through the first and second substantially continuous rotations, and the method may further comprise discharging the fluid from a nozzle of the laser cutting apparatus along a second radial path as the deflector is moved through the first and second substantially continuous rotations. The second radial path may at least partially overlap the first radial path at each point of the first and second substantially continuous rotations of the deflector.

The method may further comprise measuring a penetration depth of the laser beam into the subterranean formation at least once during each of the plurality of cycles. Measuring the penetration depth may comprise: emitting a signal into the radial slot; receiving the signal reflected by an end of the radial slot; and determining depth of the radial slot based on a duration of travel of the signal. Measuring the penetration depth may utilize a light sensor, an acoustic sensor, and/or an electromagnetic sensor.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus, comprising:
 a laser cutting apparatus conveyable within a casing lining at least a portion of a wellbore that extends into a subterranean formation, wherein the laser cutting apparatus comprises:

a housing;

a deflector operable for rotation relative to the housing to direct a laser beam to form a radial slot extending through the casing and into the subterranean formation;

a motor operable to rotate the deflector;

a sensor operable to generate information related to a penetration depth of the radial slot into the subterranean formation in real-time as the radial slot is formed by the laser beam;

a body connected to and rotatable by operation of the motor, and wherein the deflector and the sensor are each connected to and rotate with the body; and a processing device operable to receive the information generated by the sensor and cause the motor to rotate the deflector based on the received information.

2. The apparatus of claim 1 wherein the sensor is a light sensor operable to detect reflection of a portion of the laser beam from an end of the radial slot, and wherein the processing device is further operable to determine the penetration depth of the radial slot in real-time based on time of travel of the laser beam from the deflector to the light sensor.

3. The apparatus of claim 1 wherein the sensor is an acoustic sensor operable to emit an acoustic signal into the radial slot and detect reflection of the acoustic signal from an end of the radial slot.

4. The apparatus of claim 1 wherein the sensor is an electromagnetic sensor operable to emit an electromagnetic signal into the radial slot and detect reflection of the electromagnetic signal from an end of the radial slot.

5. The apparatus of claim 1 wherein the sensor comprises a signal emitter and a signal receiver, wherein the signal emitter is operable to emit a signal into the radial slot, wherein the signal receiver is operable to receive the signal reflected by an end of the radial slot, and wherein the processing device is further operable to determine the penetration depth of the radial slot in real-time based on a duration of travel of the signal between the signal emitter and the signal receiver.

6. The apparatus of claim 1 wherein:

the wellbore extends from a wellsite surface;

the laser cutting apparatus is conveyable within the casing via coiled tubing operable to communicate a fluid from the wellsite surface to the laser cutting apparatus;

the fluid is substantially transparent to the laser beam;

the deflector is operable to direct the laser beam along a first radial path; and the laser cutting apparatus further comprises a nozzle operable to discharge the fluid along a second radial path that at least partially overlaps the first radial path.

7. A method, comprising:

conveying a laser cutting apparatus within a casing lining at least a portion of a wellbore that extends into a subterranean formation;

transmitting a laser beam to a deflector of the laser cutting apparatus; and operating a motor of the laser cutting apparatus to control rotation of a body connected to the deflector and at least one sensor of the laser cutting apparatus, thus directing the laser beam deflected by the deflector to form a radial slot extending through the casing to a predetermined depth within the subterranean formation, including operating the motor to sequentially rotate the deflector to each one of a plurality of angular positions and to maintain the deflector at each successive one of the plurality of angular positions until the laser beam penetrates the subterranean formation to the predetermined depth at the respective angular position based on a penetration depth measured by the at least one sensor, such that the radial slot extends through a predetermined angle encompassing the plurality of angular positions.

8. The method of claim 7 wherein each of the plurality of angular positions corresponds to a width of the laser beam.

9. The method of claim 7 wherein:

the wellbore extends from a wellsite surface;

conveying the laser cutting apparatus within the casing is via coiled tubing;

the method further comprises communicating a fluid from the wellsite surface to the laser cutting apparatus via the coiled tubing;

the fluid is substantially transparent to the laser beam;

the deflector is operable to direct the laser beam along a first radial path at each of the plurality of angular positions;

the method further comprises discharging the fluid from a nozzle of the laser cutting apparatus along a second radial path at each of the plurality of angular positions; and the second radial path at least partially overlaps the first radial path.

10. The method of claim 7 further comprising measuring the penetration depth of the laser beam into the subterranean formation in real-time at each of the plurality of angular positions using the at least one sensor of the laser cutting apparatus.

11. The method of claim 10 wherein measuring the penetration depth comprises:

emitting a signal into the radial slot;

receiving the signal reflected by an end of the radial slot; and determining depth of the radial slot based on a duration of travel of the signal.

12. The method of claim 10 wherein the at least one sensor comprises at least one of a light sensor, an acoustic sensor, and an electromagnetic sensor.

13. A method, comprising:

conveying a laser cutting apparatus within a casing lining at least a portion of a wellbore that extends into a subterranean formation;

transmitting a laser beam to a deflector of the laser cutting apparatus; and operating a motor of the laser cutting apparatus to repeatedly rotate a body connected to the deflector and at least one sensor of the laser cutting apparatus through a plurality of cycles, wherein each of the plurality of cycles comprises a first substantially continuous rotation of the deflector through a predetermined angle in a first rotational direction and a second substantially continuous rotation of the deflector through the predetermined angle in a second rotational direction, thus directing the laser beam deflected by the deflector to form a radial slot extending radially through the casing and, with each successive one of the plurality of cycles, extend the radial slot to a predetermined depth within the subterranean formation based on a penetration depth measured by the at least one sensor, such that opposing first and second sides of the radial slot are angularly disposed at the predetermined angle.

14. The method of claim 13 wherein operating the motor further comprises decreasing angular velocity of the first and second substantially continuous rotations of the deflector during one or more of the plurality of cycles.

15. The method of claim 14 wherein the angular velocity of the first and second substantially continuous rotations of the deflector is decreased during one or more of the plurality of cycles by an amount to deliver a substantially constant amount of energy per unit length of the subterranean formation being cut at the penetration depth of the laser beam in that one of the plurality of cycles.

16. The method of claim 13 wherein:
the wellbore extends from a wellsite surface;
conveying the laser cutting apparatus within the casing is via coiled tubing;
the method further comprises communicating a fluid from the wellsite surface to the laser cutting apparatus via the coiled tubing;
the fluid is substantially transparent to the laser beam;
the deflector is operable to direct the laser beam along a first radial path as the deflector is moved through the first and second substantially continuous rotations;
the method further comprises discharging the fluid from a nozzle of the laser cutting apparatus along a second radial path as the deflector is moved through the first and second substantially continuous rotations; and
the second radial path at least partially overlaps the first radial path at each point of the first and second substantially continuous rotations of the deflector.

17. The method of claim 13 further comprising measuring the penetration depth of the laser beam into the subterranean formation at least once during each of the plurality of cycles using the at least one sensor of the laser cutting apparatus.

18. The method of claim 17 wherein measuring the penetration depth comprises:
emitting a signal into the radial slot;
receiving the signal reflected by an end of the radial slot; and
determining depth of the radial slot based on a duration of travel of the signal.

19. The method of claim 17 wherein the at least one sensor comprises at least one of a light sensor, an acoustic sensor, and an electromagnetic sensor.

\* \* \* \* \*